United States Patent [19]

Sumiya et al.

[11] Patent Number: 5,647,925

[45] Date of Patent: Jul. 15, 1997

[54] PNEUMATIC TIRE FOR HEAVY-LOADED VEHICLES, WITH RESISTANCE TO RIVER WEAR

[75] Inventors: Yoshiro Sumiya, Minoo; Hiroaki Sugimoto, Higashi osaka, both of Japan

[73] Assignee: Toyo Tire & Rubber Co., Ltd., Osaka, Japan

[21] Appl. No.: 350,957

[22] Filed: Dec. 7, 1994

[30] Foreign Application Priority Data

Dec. 17, 1993 [JP] Japan ................................. 5-343975
Dec. 17, 1993 [JP] Japan ................................. 5-343976

[51] Int. Cl.$^6$ .............. B60C 3/00; B60C 11/00; B60C 11/01
[52] U.S. Cl. .................. 152/209 R; 152/454; 152/526
[58] Field of Search ........................ 152/209 R, 454, 152/526

[56] References Cited

U.S. PATENT DOCUMENTS 4,155,392  5/1979  Duderstadt et al. .
4,442,879  4/1984  Uemura ........................ 152/454 X

FOREIGN PATENT DOCUMENTS

| | | | |
|---|---|---|---|
| 2343747 | 3/1975 | Germany .............. | 152/209 R |
| 54-159902 | 12/1979 | Japan . | |
| 62-295702 | 12/1987 | Japan ................... | 152/454 |
| 2-81704 | 3/1990 | Japan ................... | 152/454 |
| 5-77608 | 3/1993 | Japan . | |
| 5-77609 | 3/1993 | Japan . | |

*Primary Examiner*—Adrienne C. Johnstone
*Attorney, Agent, or Firm*—Flynn, Thiel, Boutell & Tanis, P.C.

[57] ABSTRACT

A pneumatic tire for trucks, buses, etc. having a tread profile, before inflation, which has a first circular arc forming a tread center area and second circulr arcs forming shoulder ribs at both sides of the first circular arc, the first and second circular arcs intersecting together at a point from which the shoulder rib starts to extend and inwardly of which there is a ¼ tread width point from a tread center axis, the first and second circular arcs having an inner radial divergence, between an inside wall top of an outermost main groove and the intersecting point, of up to 3 mm and an outer edge divergence, between an outer edge of the shoulder rib and an elongated line of the first circular arc, of up to 10 mm, whereby a good river wear resistance is attained. The tire has a belt portion, below the tread portion, including a working belt ply composite and preferably has such a tread rubber thickness to an uppermost working belt ply that is larger at an end of the uppermost working belt ply than at the tread center axis.

2 Claims, 5 Drawing Sheets

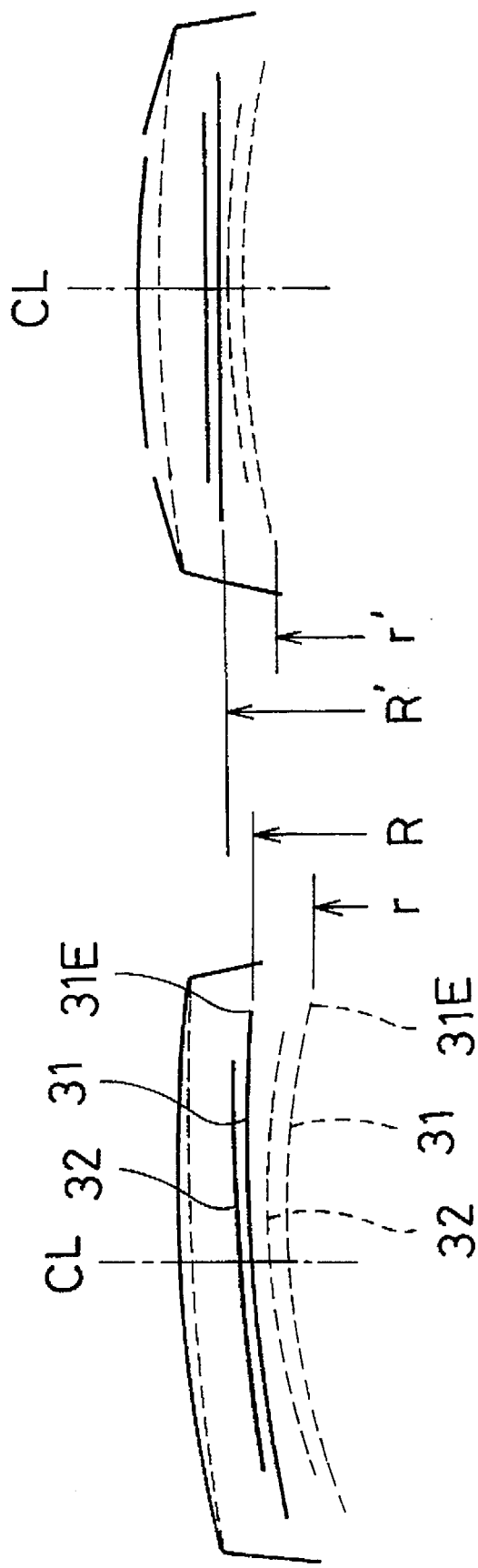

$B \geqq A \, (b \geqq a)$ $B' < A' \, (b' \doteqdot a')$

PNEUMATIC TIRE FOR HEAVY-LOADED VEHICLES, WITH RESISTANCE TO RIVER WEAR

BACKGROUND OF THE INVENTION

1. Field of the Invention

This invention relates to a pneumatic tire for heavy-loaded vehicles such as trucks, buses, etc. which is improved in resistance to river wear of the tread by impeding the occurrence of river wear and avoiding reverse warping deformation of belt plies during service growth of the tire.

2. Statement of Related Art

In so-called tires for a heavy load used for transport by trucks and buses in a trend toward high-speed, long-distance service as seen in the highways of Japan as well as for long-distance, high-speed cruising in the North America market, various performance characteristics such as tread wear life, resistance to river wear, etc. during service are virtually dependent on the tire profile and characteristics of the inflated or grown tire.

In particular, general use as in the Japanese domestic market with frequent stops and goes, promotes heavy abrasive wear conditions with faster wear and accordingly, the degree of occurrence of river wear is so small that the grown configuration of the tire has little effect on tire performance. However, under high-speed, long-distance cruising conditions where the wear rate is small, movement of the tread within the contact patch that is ascribable to changes in footprint contour and tire construction has an adverse effect on irregular wear performance (e.g. river wear). For this reason, a natural inflated profile of a tread inclusive of belt and carcass plies is of importance for fundamental designing of a tire for trucks and buses, and a variety of attempts have been made.

As one example of the attempts, a pneumatic tire for a heavy load is known, which tire has a tread profile formed of a single circular arc with a single radius of curvature. Because of the single curvature form of the tread, it assumes, upon contact with the ground, such a footprint contour that the length at the tread edges in the circumferential direction of the tire is shorter than the length at the tread center, and the tire is likely to induce an initiation stage of river wear since the tire must compensate for the difference in contact length by shoulder slippage.

Further, tires having a double crown tread are also known which have a tread profile constructed of two different radii of curvature. One example of a double-crown tire is disclosed in Japanese Patent First Publication No. 54-159902 (1979), wherein circular arc sections forming tread shoulder areas have a larger radius of curvature than a circular arc section forming a tread center area, and two different circular arc sections are adjacent to each other at a tangential point. Since two kinds of circular arc sections are tangent to each other without intersecting, the tire exhibits a good straight line stability, but has a problem in that when the tire undergoes side force action during running, erosion of shoulder rib edges takes place that leads to river wear in the center area.

In order to reduce river wear and shoulder step wear, a further attempt has been made to configure the tread profile so that the boundary zones between the tread center area and shoulder areas may extend in a concave bent profile (Japanese Patent First Publication No. 5-77608(1993)). However, so-called rib punching occurs because assumedly, its one-fourth tread width point (¼ TW point) that is spaced apart a distance of ¼ the tread width from the tire center axis is recessed, which results in slippage and tread wear that is responsible for initiation of irregular wear.

Further with a view toward simultaneously diminishing tread center wear and shoulder wear, a tire has been proposed, wherein the shoulder areas are configured as a straight line profile (Japanese Patent First Publication No. 5-77609 (1993)). This is aimed at a low profile tire and is not suited to general tires. Moreover because of the rectilinear configuration of the shoulder areas, river wear or irregular wear is likely to occur owing to a wiping action of lateral force within the contact patch that is generated by deflection of the sidewall which force is transmitted to the tread shoulder areas as the tire rolls.

With tires for heavy-loaded vehicles such as trucks or buses, in general, they are inflated and grow from high inflation pressure, heavy load and heat build-up during running to assume a specific natural inflated profile, namely, a stable configuration owing to the balance between the tension force of the carcass and the inflated pressure.

In order to elucidate the mechanism of river wear, the inventors have investigated the correlation between river wear characteristics and change or deformation of a tread, belt and carcass profile caused by inflation, using a single crown tire as shown in FIGS. 3A and 5A, on which the design of the invention will be based, and a conventional double-crown tire as shown in FIGS. 3B and 5B for comparison purposes.

With the conventional double-crown tire wherein the crown profile before and after inflation and the cross-sectional view of the deflected tire when contacting with the ground are schematically illustrated respectively in FIG. 3B and FIG. 4B, the profile of the tire before inflation as shown in dash lines is changed to that shown in solid lines, owing to tension forces exerted on the tire by inflation, wherein the belt portion forming a tire skeleton has uneven radii and exhibits reverse warping phenomenon, and the tread crown CR, carcass ply CC and belt plies BT grow unevenly. Consequently, the tread crown profile is unstable and liable to change in configuration, so that the tire lacks wear resistance.

On the other hand, the profile of a single crown tire before and after inflation is schematically illustrated in FIG. 3A and the cross-sectional view of the deflected tire is schematically illustrated in FIG. 4A respectively. As can be seen, the single-crown tire shows even growth of the tread profile, and the tension force created by inflation is shared equally by the belt and carcass portions BT,CC.

Further entering into the details thereof, the configurational change of the double-crown tire (FIG. 3B) is such that edges of the belt plies are deformed as if they might pierce through the shoulder rib SR whereby the stress of inner pressure is transmitted to the rubber of shoulder area SH and the outer ends of the shoulder rib SR are pulled downwardly. As a result, the tread crown CR is deformed into a shoulder drop profile, wherein the ¼ TW point, namely a point spaced apart a distance of one-fourth the overall tread width from the tread center axis CL, protrudes. This is presumed to be caused by the enlargement of the belt radius as tension and belt rigidity increase with pressure, which would interfere with the tread crown configuration when the belt radius exceeds the tread crown radius, forcing out the ¼ TW point. Since belt and ply can no longer withstand the inner pressure in such a case, the stress of inner pressure not only causes an uneven configurational change, but the tension is transmitted to the surrounding rubber material of the tread with a lower elastic modulus, which easily deforms to cause surface distortion of the tire, undermining even growth and irregular wear resistance altogether.

Additionally, because of the concave profile of the belt portion in the tread center area and the upturned belt edges as seen in FIG. 5B, the tread thickness B' above the outermost position of the belt 3BT is thinner than the tread thickness A' at the center position of the belt 3BT, and such form of the belt resembles a deformed concave shape of the belt under load as illustrated in FIG. 4B, even though no load is applied as in FIG. 3B.

The concave, reverse warping deformation of the belt ply composite after service growth is common to conventional tires, and affects tire performance because a firm tire contact with the road is not ensured. For a firm and uniform contact of the tread, the overall shape of the inflated belt ply composite combined with tread rubber thickness above the belt edge are important factors owing to the fact that reinforcement of the tread by the belt reduces movement between the tread elements and the road within the contact patch. Therefore, belt ply rigidity that resists deformation within the contact patch is one of the major factors dominating tire performances.

Accordingly, tires prone to causing a reverse warping deformation as in FIG. 3B lack belt rigidity needed for a firm tread contact, significantly reducing the road-hugging properties of the tire needed to improve irregular wear resistance. The contact with the road is impaired in the central tread area of the concave belt ply composite since the tread rubber adhered to the belt must follow the concave contour of the belt under load as in FIG. 4B.

The construction of such a belt lacks sufficient belt resistance (to tire deflection) needed to force the tread rubber against the road for a firm tread contact. The protruding, reversely warped belt edge also causes shoulder-drop configuration of the tread profile (FIG. 3B), disrupting load distribution within the contact patch as the contact pressure concentrates on the protruding rib edge at the ¼ TW point. Combined with the wiping action of a lateral force generated within the contact patch, a round off wear of the rib edge corner develops and leads to the initiation of river wear.

On the contrary, with the other tire (single-crown), the toroidal shape of the belt with a sufficient belt rubber thickness at the belt edge BTE ensures firm contact of the central tread and an even load distribution within the contact patch for a good road-hugging property (FIG. 4A).

Now, changes of the belt ply composite BT (for example, of three plies) and the crown portion CR will be explained with reference to FIGS. 5A, 5B.

With the conventional double-crown tire (FIG. 5B), before growth or inflation (dash lines), the tread thickness a' at the tread center axis CL from the uppermost working belt ply 3BT to the tread surface is substantially equal to the tread thickness at the outermost edge of the working belt 3BT from there to the tread surface whereas after growth (solid lines), the tread thickness B' at the outermost belt edge is smaller than the tread thickness A' at the tread center axis CL.

The belt ply composite of the double-crown tire has a reasonable belt curvature before growth, but causes reverse warping deformation during growth owing to an increase in belt curvature. By contrast, with the single-crown tire (FIG. 5A), the belt ply composite grows evenly in an equal proportion.

The reverse deformation of the belt ply composite is explained referring to FIG. 6B, which is an illustrated example of an intermediate working belt ply 2BT of the three belt construction. In the intermediate belt 2BT of the double-crown tire (FIG. 6B), steel cords embedded in the diagonal direction I'J' are shown with tension F from inner pressure being applied in the direction of the X-axis. Here, a deformation inherent in a composite material, namely, a cross-elasticity effect naturally appears. Mainly caused by the absence of reinforcing cords in the diagonal direction of G'H', shear deformation in the direction of G'H' as shown in solid lines of FIG. 6B occurs, creating an a symmetrical elongation between diagonal directions of I'J' and G'H' (I'J'<<G'H') under tension F.

This shear deformation tends to occur conspicuously when there is an increase of belt rigidity from tension F in the X-axis owing to the low angle belt ply and when a high-tension steel cord is adopted that is constructed of two or more layers of filaments twisted in the same direction. The iron of the steel cord preferably has a carbon content of 0.75–0.85% by weight. In particular, the deformation magnitude in the circumferential direction of the tire (X-axis), which is relative to the amount of tire growth, is to be noted. As is apparent from FIG. 6B, the growth amount c' at the tread center axis CL is significantly smaller than the growth amount d' the belt (c'<<d'). The upturning deformation of the belt edge as shown in FIG. 5B is therefore considered to be due to the tire growth at the belt edge in the circumferential direction exceeding that of the tire center axis CL. Thus, the growth of the belt edge is excessive as compared to the growth of the belt at the tire central axis as shown in FIG. 5B, which causes the reverse warping deformation of the belt ply composite.

It should be noted that two-dimensional top views of the belt ply construction in FIGS. 6A and 6B merely illustrate asymmetrical shear deformation of the belt plies. Therefore belt angle alteration does not correspond directly with that of the actual tire. In the actual tire, the belt ply composite such as in FIG. 6B with a belt edge diameter that is similar to a diameter of the central axis (Cf. FIG. 5B) would naturally form a cylindrical shape. The open belt ends (EPI) at both belt edges during inflation would compensate for the difference in circumference by large deformation d' and belt angle alteration that result in a flare-out shape of the belt edge causing reverse warping deformation. But, the belt composite as seen in FIG. 6A forming a curvature across the cross-section of the belt would form a toroidal shape. In contrast to the belt in FIG. 6B, the tight belt ends (EPI) of the smaller belt edge diameter (Cf. FIG. 5A) would result in minimum deformation and belt angle alteration.

Thus in view of the cause for reverse warping deformation of the belt ply composite with the conventional double-crown tire as described above (FIGS. 5B, 6B), we have found that it is essential in tire design that after growth, the deformation magnitude c of the belt ply composite at the central axis be equal to or larger than the deformation magnitude d at the belt edge (c≧d) as is shown with the single-crown tire in FIG. 6A.

Further we have found that in the prior art tire after growth, the reverse warping deformation that forces out the belt edge, and accordingly, the ¼ TW point, results in loss of sufficient tread rubber thickness B' at the working belt edge (B>B').

Accordingly, in order to impede the loss of the tread thickness above the uppermost working belt ply, which is caused by the reverse warping deformation during tire growth, this invention is designed to raise the shoulder ribs of the tire upon molding so that the shoulder thickness b above the edge of the uppermost working belt may be thicker than the tread thickness a above the working belt ply of the tread center axis while simultaneously rectifying the protrusion of the ¼ TW point.

A general object of this invention is therefore to provide a pneumatic tire for heavy-loaded vehicles having an improved river wear resistance.

SUMMARY OF THE INVENTION

The invention for attaining the foregoing object resides in a pneumatic tire for heavy-loaded vehicles having a tread portion including on its surface a plurality of main grooves extending in the circumferential direction of the tire and a plurality of belt plies including a working belt composite located directly below the tread portion. The tread portion, when the tire is not inflated, has a tread profile which comprises a first circular arc forming a tread center area that has a radius of curvature centered on its tread center axis and second circular arcs forming shoulder ribs at both sides of the tread center area that each have the same or a different radius of curvature relative to the first circular arc. The first circular arc and each of the second circular arcs intersect at an inner edge point of the shoulder ribs which is at the top of an outer wall of the outermost main groove, the first circular arc having thereon ¼ tread width points each spaced apart a distance of one-fourth the overall tread width from the tread center axis and located inwardly of the point at which the first and second circular arcs intersect. The first circular arc and the second circular arcs are profiled so that each of the second circular arcs has a divergence, from an outer edge of the shoulder rib downwardly to an extended line of the first circular arc, of up to 10 mm and a radial divergence, between a top of an inner wall of the outermost main groove and the intersection point, of up to 3 mm.

In a preferred embodiment of the invention, the tread thickness at the outer edges of the uppermost working belt ply should be larger than the tread thickness at the tread center axis of the uppermost working belt ply. Further it is preferred that the first circular arc have a radius of curvature of 300 to 2000 mm whereas the second circular arc has a larger radius of curvature than the first circular arc, but smaller than 4000 mm.

Thus, according to this invention, two kinds of circular arcs intersect at the point outwardly of the ¼ tread width point relative to the tread center axis so that there is a radial divergence between the intersection point and the top of the inside wall of the outermost main groove. Only the shoulder ribs are raised so that the tread thickness above the uppermost working belt edge may be thicker than the tread thickness above the uppermost working belt at the tire center axis. As a consequence, a reverse warping deformation of the working belt ply composite caused by tire growth can be avoided, and protrusion of the ¼ TW point from tire growth be corrected.

Although a sufficient thickness (b) above the uppermost working belt edge is ensured by raising the shoulder rib upon molding, the thicker tread rubber of the shoulder depresses the belt edges, forming a toroidal shape with a smaller belt edge diameter (R) than that (R') of a cylindrical working ply composite in the conventional tire, as is apparent from the comparison between this invention and the prior art (FIGS. 2A, 2B).

With the conventional tire as shown in FIG. 2B, the deformation of the working belt ply having a belt edge diameter that is similar to a diameter at the central axis (FIG. 5B), after growth, yields a cylindrical belt ply composite. Such a reverse warping deformation occurs from excessive growth and angular alteration of the belt edge d' (FIG. 6B) exceeding the growth c' of the tread center axis (c'<d'), causing the open ends at the belt edges to flare out. The open ends (low EPI (ends per inch) from excess growth) reduce considerably the tensile strength, promoting further growth of the belt edges that causes the reverse warping deformation and undermines the tread profile and belt durability.

This phenomenon, explained by the shear deformation of the working belts, is illustrated in the two-dimensional top views of FIGS. 6B and 6A. The deformation magnitudes in the directions of IJ and I'J' do not differ so much from each other because of the reinforcing cords. However, deformation in the GH or G'H' direction, where reinforcing cords do not exist, depends on the tensile strength of the belt rubber topping and the structural stiffness from the overall shape of the belt composite. The belt edge of a larger diameter r' that will form the cylindrical working belt composite in the conventional tire (FIG. 2B) lacks structural stiffness, and the deformation of the belt in the G'H' direction is mostly limited to the tensile deformation of the rubber, causing excessive growth d'(c'<d') which is accompanied with large belt angle alteration at the belt edges. By contrast, a smaller belt edge diameter r of the inventive tire forming the toroidal belt ply composite adds structural stiffness to the tensile strength of the belt, shifting a larger growth c to the tread center axis with minimum angular belt alteration and belt deformation d (c>d) at the tight belt edge ends.

As a result, a smaller deformation magnitude (d) at the belt edge is apparent as compared to the deformation magnitude (d') of the conventional tire (d<d').

Further, the growth magnitude (c) in the belt center (tread center axis) is larger than the deformation magnitude (d) at the belt edge (c>d) in contrast to the relation of c'<d' as seen in the conventional tire.

Thus, uniform growth of the tread as in FIG. 5A is possible since most of the deformation accompanied with the growth occurs at the tread center axis, minimizing deformation of the belt edges in the toroidal shaped belt composite for an improved river wear resistance and belt durability. That is, the tire of the invention thus molded assumes a natural inflated profile the same as before growth, and accordingly, is stabilized.

BRIEF DESCRIPTION OF THE DRAWINGS

Examples of the invention will be decribed hereinbelow in more detail with reference to the accompanying drawings, but the invention should not be construed as limited to the examples.

FIGS. 2A and 2B are sectional illustrations of a tire of this invention and a prior art tire, respectively, showing respective changes in the diameter of each of the belts before and after tire growth;

DETAILED DESCRIPTION

Figure 1:
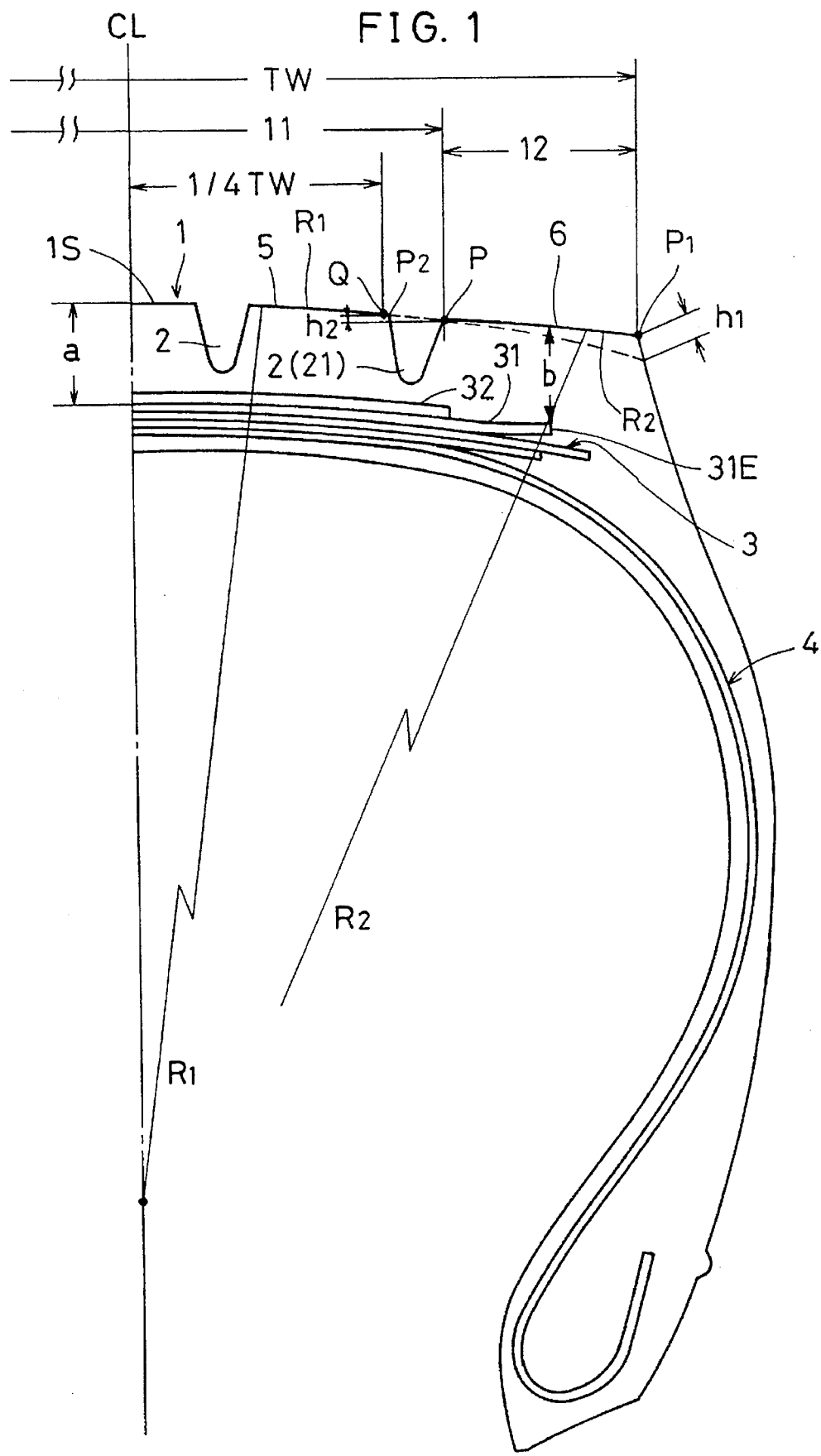
FIG. 1 is a longitudinal sectional view of a tire pertaining to one example of this invention showing the construction of its tread and belt portions on the right side thereof.
Figure 3A:
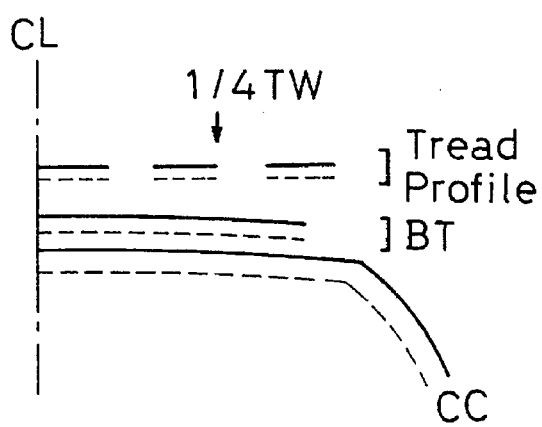
FIGS. 3A and 3B are sectional illustrations of a tire of this invention and a prior art tire, respectively, showing deformed states of the belt ply composite, tread and carcass profile before and after tire growth.
Figure 3B:
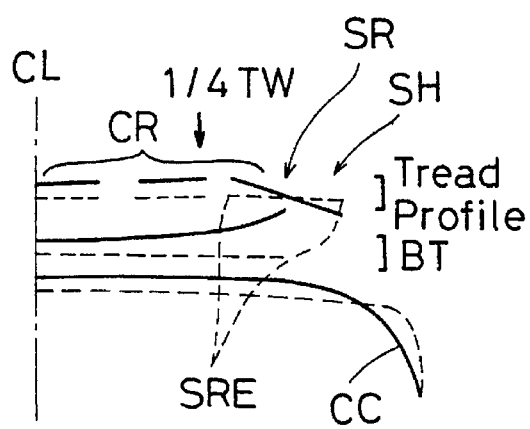
Figure 4A:
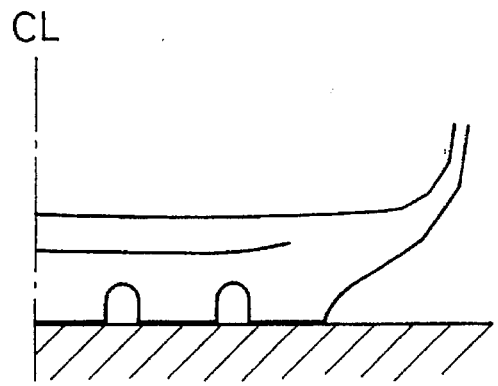
FIGS. 4A and 4B are sectional views similar to FIGS. 3A and 3B showing the tread and belt configuration under a load.
Figure 4B:
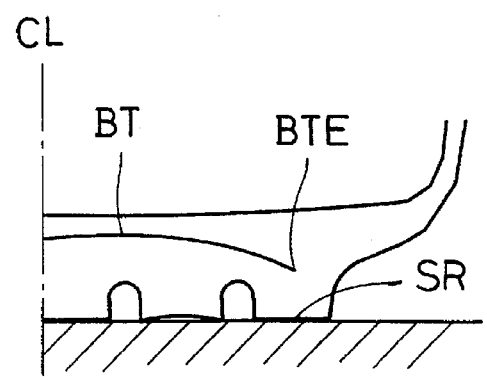
Figure 5A:
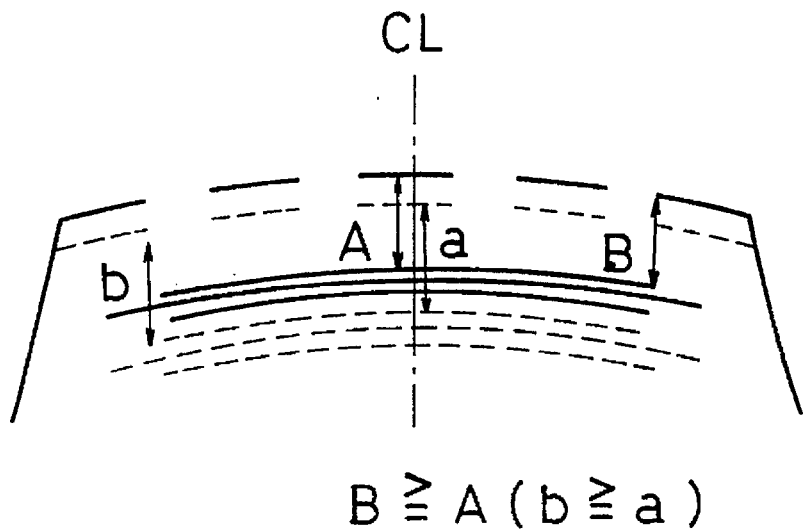
FIGS. 5A and 5B are sectional views similar to FIGS. 3A and 3B showing respective changes in tread thickness above the uppermost working belt ply before and after tire growth.
Figure 5B:
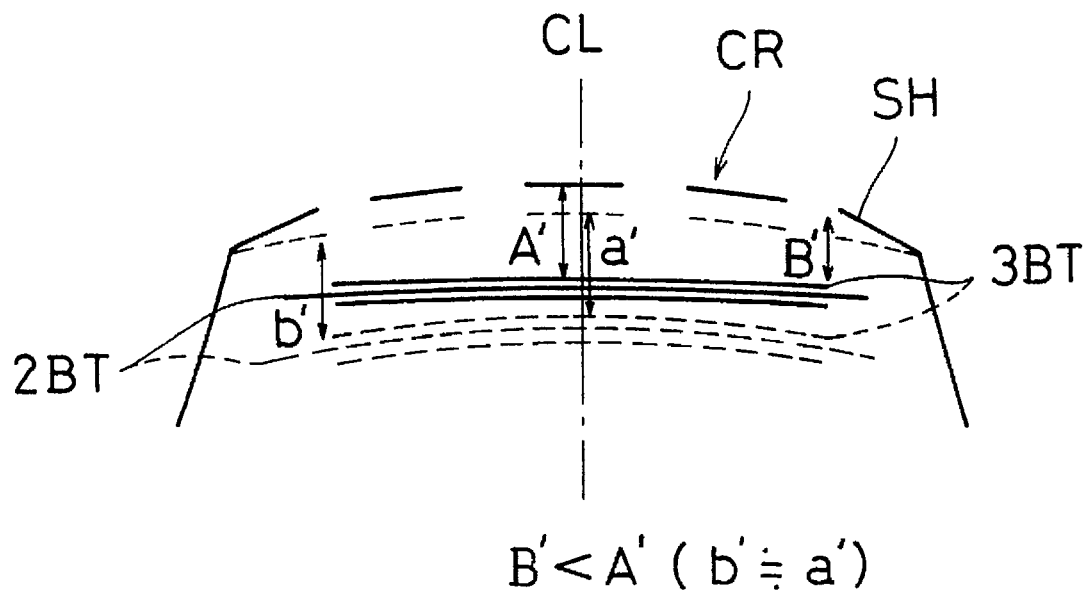
Figure 6A:
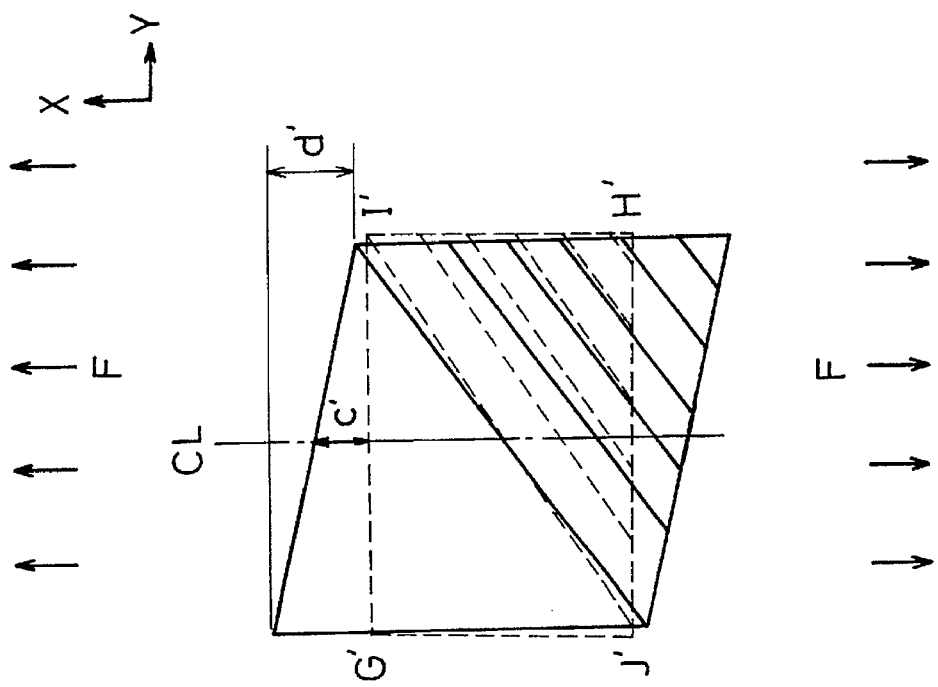
FIGS. 6A and 6B are similar views to FIGS. 3A and 3B illustrating the belt deformation by tension force due to inflation pressure after tire growth.
Figure 6B:
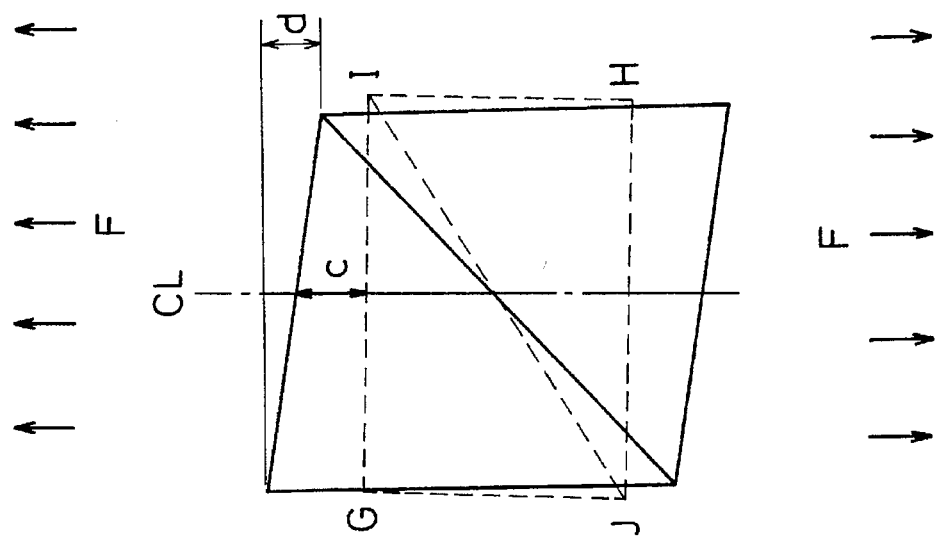

Referring to FIG. 1, a typical example of a tire, before inflation, pertaining to this invention is shown on its right half, which has a tread portion 1 including on its surface 1S a plurality of main grooves 2 extending in the circumferential direction of the tire and a belt portion 3 located below the tread portion 1. The reference numeral 4 is a carcass ply.

The surface 1S of the tread portion 1 forms a tread profile including a first circular arc 11 of a radius of curvature $R_1$ centered on a tread center axis CL and second circular arcs 12 of a radius of curvature $R_2$ at both sides of the first circular arc 11.

The first circular arc 11 and the second circualar arc 12 intersect at a point P which is an outer edge of an outermost main groove 21 located most outwardly of the tread center axis CL and an inner edge of a shoulder rib 6.

The first circular arc 11 extends between the intersection points P,P thus forming a tread center area having a rib portion 5. The second circular arc 12 extends from the intersection point P at the outermost main groove 21 to an outer edge point $P_1$ of the shoulder rib 6, thus forming the shoulder rib 6.

The radius center of the second circular arc 12 is not always located on the rotational axis side of the tire, but may be outside the rotational axis side. In the latter case, the second circular arc 12 assumes more or less a concave profile. In a preferred embodiment, the radius of curvature $R_1$ before inflation of the tire is in a range of 300 to 2000 mm whereas the radius of curvature $R_2$ is equal to or larger than $R_1$, but smaller than 4000 mm.

The first circular arc 11 has, on either side of the tread, a ¼ tread width point Q that is spaced apart one-fourth the overall tread width TW from the tread center axis CL and is located short of the intersection point P between the two circular arcs 11,12.

The shoulder rib 6 is raised toward the outer edge $P_1$, starting from the intersection point P so that there is a divergence $h_1$ at the shoulder rib edge $P_1$, between the second circular arc 12 and an elongated line of the first circular arc 11, of up to 10 mm, preferably up to 5 mm. If the divergence $h_1$ exceeds over 10 mm, the footprint length at the shoulder edge $P_1$ upon contacting with the ground will be larger than the footprint length at the center or the ¼ tread width point Q, which causes rib punching and accordingly, river wear.

On the other hand, a radial divergence $h_2$ between the intersection point P and an inner edge (wall top) point $P_2$. of the outermost main groove 21 is in the range of up to 3 mm. If the radial divergence $h_2$ exceeds over 3 mm, the difference in radius of curvature between the two circular arcs 11,12 will be too large, which promotes the occurrence of river wear at the edge portion of the shoulder rib 6. If the radial divergence $h_2$ is too small and approaches zero, there will occur rib punching due to subsidence of the rib 5 at the ¼ tread width point Q.

The belt portion 3 includes three belt plies that are all working belt plies 31 or four belt plies whose lower three plies are working belt plies 31 and whose uppermost ply is a protector belt ply 32.

The uppermost working belt ply 31 plays an important roll in a so-called reverse warping deformation of the belt portion.

It is preferred that the tread thickness (a) at the tread center axis CL from the uppermost working belt ply 31 to the tread surface 1S be smaller than the tread thickness (b) at the edge of the uppermost working belt ply 31 (a<b).

It is most essential in this invention in order to rectify the protrusion of the point Q after growth that the intersection point P of the first and second circular arcs 11,12 serve as a starting point at which the shoulder rib 6 is raised.

As shown in FIG. 2A, the edge 31E of the uppermost working belt ply 31 before tire growth (dash lines) and after tire growth (solid lines) has a smaller diameter R as compared with that of the prior art tire (R'). There occurs no reverse warping deformation of belt plies and the tread profile of this invention is stabilized.

EXAMPLE 1

A pneumatic tire of this invention having a crown construction listed in Table 1 below will be explained in comparison with a prior art tire.

A. Tires Tested

Size: 11 R 24.5 14 PR

Rim: 8.25×24.5

Crown construction: Table 1

B. Evaluation Method

Respective tires were measured with respect to the dimensional change in radius of curvature of the tread passing through three points, namely the tread center line point and both shoulder edge points $P_1,P_1$ and the protrusion magnitude at the point Q by means of a radius ruler. Mileage upon dismounting of the tires (first life of tire) and reasons for the removal were evaluated.

The results obtained are given in Table 1.

TABLE 1

|  | Invention Tire | Conventional Tire |
|---|---|---|
| Radius of curvature of tread ($R_1/R_2$) | 540/1000 mm | 520/1000 mm |
| Double crown structure | Only shoulder ribs are raised | Tangential arcs |
| Divergence $h_1/h_2$ | 1.32/0.8 mm | 2.5/0.5 mm |
| Three-point radius | 600 mm | 480 mm |
| Protrusion at Q | 0.5 mm | 1.5 mm |
| Mileage (average life) | 137,000 Km (214) | 64,000 Km (100) |
| Reason for dismounting of tire | Jolting due to step-wear of shoulder ribs originating from river wear | the same as left |

EXAMPLE 2

A tire according to this invention was tested to simulate service growth as in Example 1 and evaluated as compared with a conventional tire.

Tires Tested

Size: 11 R 22.5 14 PR

Rim: 8.25×22.5

Inflation pressure: 7.4 kg/cm2

Load on drum: 2,750 Kg

Speed: 88 Km/h

Results obtained are given in Table 2 below.

TABLE 2

|  | Invention Tire | Conventional Tire |
|---|---|---|
| Tread radius ($R_1/R_2$) (mm) | 540/1000 | 520/1000 |
| Raising magnitude $h_1$ at shoulder edges (mm) | 1.5 | 2.75 |
| Divergence $h_2$ (mm) | 1.0 | 1.5 |
| Tread width (mm) | 215 | 219 |
| Three-point radius of tread (mm) | 640 | 560 |
| Three-point radius of belt (mm) | 660 | 800 |
| Tread thickness (a) (mm) | 19 | 19 |
| Tread thickness (b) (mm) | 21 | 19 |
| Position of Q from the tread center axis (mm) | 53.75 | 54.75 |
| Position of P (mm) | 66.73 Intersection point | 55.3 Tangential point |
| Double crown structure | Only shoulder ribs are raised | — |

What is claimed is:

1. A pneumatic tire for heavy-loaded vehicles comprising belt plies extending in a circumferential direction and a tread portion which includes a tread surface thereof and a plurality of main grooves opening radially and extending in the circumferential direction of said belt plies, a tread center axis extending radially and centrally through said belt plies and said tread portion, each said main groove defined by an inside wall and an outside wall, said belt plies including a working belt ply composite located directly below said tread portion, said tread portion having a tread profile, when the tire is not inflated, which comprises a first circular arc section forming a tread center area and a pair of second circular arc sections forming shoulder ribs on opposite outer sides of said tread center area, each said shoulder rib having an outer edge and extending inwardly to an inner edge defined by said outside wall of an outermost one of said main grooves, said first circular arc section and each of said second circular arc sections intersecting at an intersection point on said inner edge of each said shoulder rib which is atop said outside wall of said outermost main groove located most outwardly of said tread center axis, said first circular arc section having thereon one-fourth tread width points spaced apart a distance of one-fourth of an overall tread width from said tread center axis and located inwardly of said intersection point at which said first and said second circular arc sections intersect, said first circular arc section and each said second circular arc section being profiled with each said second circular arc section disposed radially outside said first circular arc section proximate said outer edge so that each of said second circular arc sections has a first divergence between said outer edge of each said shoulder rib and an extended line of said first circular arc section of a value greater than 0 mm and up to 10 mm, and has a radial second divergence, between a top end of said inside wall of said outermost main groove and said intersection point of up to 3 mm, said first circular arc section having a first radius of curvature centered on said tread center axis and each said second circular arc section having a second radius of curvature equal to or different from said first radius of curvature, said first radius of curvature being between 300 to 2000 mm and said second radius of curvature being equal to or larger than the first radius of curvature and less than 4000 mm.

2. A pneumatic tire for heavy-loaded vehicles comprising belt plies extending in a circumferential direction and a tread portion which includes a tread surface thereof and a plurality of main grooves opening radially and extending in the circumferential direction of said belt plies, a tread center axis extending radially and centrally through said belt plies and said tread portion, each said main groove defined by an inside wall and an outside wall, said belt plies including a working belt ply composite located directly below said tread portion, said working belt ply composite having an uppermost working belt ply such that a first tread rubber thickness at edges thereof is larger than a second tread rubber thickness thereof at said tread center axis, said first and second tread rubber thicknesses extending between said uppermost working belt ply and said tread surface, said tread portion having a tread profile, when the tire is not inflated, which comprises a first circular arc section forming a tread center area and a pair of second circular arc sections forming shoulder ribs on opposite outer sides of said tread center area, each said shoulder rib having an outer edge and extending inwardly to an inner edge defined by said outside wall of an outermost one of said main grooves, said first circular arc section and each of said second circular arc sections intersecting at an intersection point on said inner edge of each said shoulder rib which is atop said outside wall of said outermost main groove located most outwardly of said tread center axis, said first circular arc section having thereon one-fourth tread width points spaced apart a distance of one-fourth of an overall tread width from said tread center axis and located inwardly of said intersection point at which said first and said second circular arc sections intersect, said first circular arc section and each said second circular arc section being profiled with each said second circular arc section disposed radially outside said first circular arc section proximate said outer edge so that each of said second circular arc sections has a first divergence between said outer edge of each said shoulder rib and an extended line of said first circular arc section of a value greater than 0 mm and up to 10 mm, and has a radial second divergence, between a top end of said inside wall of said outermost main groove and said intersection point of up to 3 mm, said first circular arc section having a first radius of curvature centered on said tread center axis and each said second circular arc section having a second radius of curvature equal to or different from said first radius of curvature, said first radius of curvature being between 300 to 2000 mm and said second radius of curvature being equal to or larger than said first radius of curvature and is less than 4000 mm.

* * * * *